United States Patent
Eldessoki et al.

(10) Patent No.: US 11,889,331 B2
(45) Date of Patent: Jan. 30, 2024

(54) AUTONOMOUS USER EQUIPMENT (UE) BEAM FAILURE RECOVERY (BFR) ABORT

(71) Applicant: Apple Inc., Cupertino, CA (US)

(72) Inventors: Sameh Eldessoki, Munich (DE); Christian Hofmann, Munich (DE); Panagiotis Botsinis, Munich (DE)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 17/333,699

(22) Filed: May 28, 2021

(65) Prior Publication Data

US 2022/0386150 A1    Dec. 1, 2022

(51) Int. Cl.
| | |
|---|---|
| *H04W 24/04* | (2009.01) |
| *H04W 76/10* | (2018.01) |
| *H04W 74/02* | (2009.01) |
| *H04W 76/25* | (2018.01) |
| *H04W 84/04* | (2009.01) |

(52) U.S. Cl.
CPC ......... *H04W 24/04* (2013.01); *H04W 74/02* (2013.01); *H04W 76/10* (2018.02); *H04W 76/25* (2018.02); *H04W 84/042* (2013.01)

(58) Field of Classification Search
CPC ..... H04W 24/04; H04W 74/02; H04W 76/10; H04W 76/25; H04W 84/042; H04W 74/0833; H04B 7/0695
USPC .......................................... 455/423; 370/338
See application file for complete search history.

(56) References Cited

U.S. PATENT DOCUMENTS

2020/0412437 A1* 12/2020 Cirik ................... H04B 7/0626

OTHER PUBLICATIONS

3GPP; "Technical Specification Group Radio Access Network; NR; Requirements for support of radio resource management (Release 17)"; Technical specification; 3GPP TS 38.133; Mar. 2021.
3GPP; "Technical Specification Group Radio Access Network; NR; Physical layer procedures for control (Release 16)"; Technical Specification; 3GPP TS 38.213; Mar. 2021.
3GPP; "Technical Specification Group Radio Access Network; NR; Medium Access Control (MAC) protocol specification (Release 16)"; 3GPP TS 38.321; Mar. 2021.
3GPP; "Technical Specification Group Radio Access Network; NR; Radio Resource Control (RRC) protocol specification (Release 16)"; 3GPP TS 38.331; Mar. 2021.

* cited by examiner

*Primary Examiner* — Marcos Batista
(74) *Attorney, Agent, or Firm* — Eschweiler & Potashnik, LLC

(57) ABSTRACT

Techniques discussed herein can facilitate autonomous user equipment beam failure recovery abort aspects. One example aspect is a baseband processor configured to perform operations including: establishing a connection with a downlink (DL) beam; detecting a beam failure of the DL beam; in response to the beam failure, executing at least one of: a beam failure recovery (BFR) procedure or a candidate beam detection (CBD) procedure; detecting a recovery abort condition while executing the at least one of: the BFR procedure or the CBD procedure; aborting the at least one of: the BFR procedure or the CBD procedure, in response to detecting that the recovery abort condition is satisfied; and maintaining the connection with the DL beam.

22 Claims, 11 Drawing Sheets

AUTONOMOUS USER EQUIPMENT (UE) BEAM FAILURE RECOVERY (BFR) ABORT

FIELD

The present disclosure relates to wireless technology, including autonomous user equipment (UE) beam failure recovery (BFR) abortion.

BACKGROUND

Mobile communication in the next generation wireless communication system, 5G, or new radio (NR) network will provide ubiquitous connectivity and access to information, as well as ability to share data, around the globe. 5G networks will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
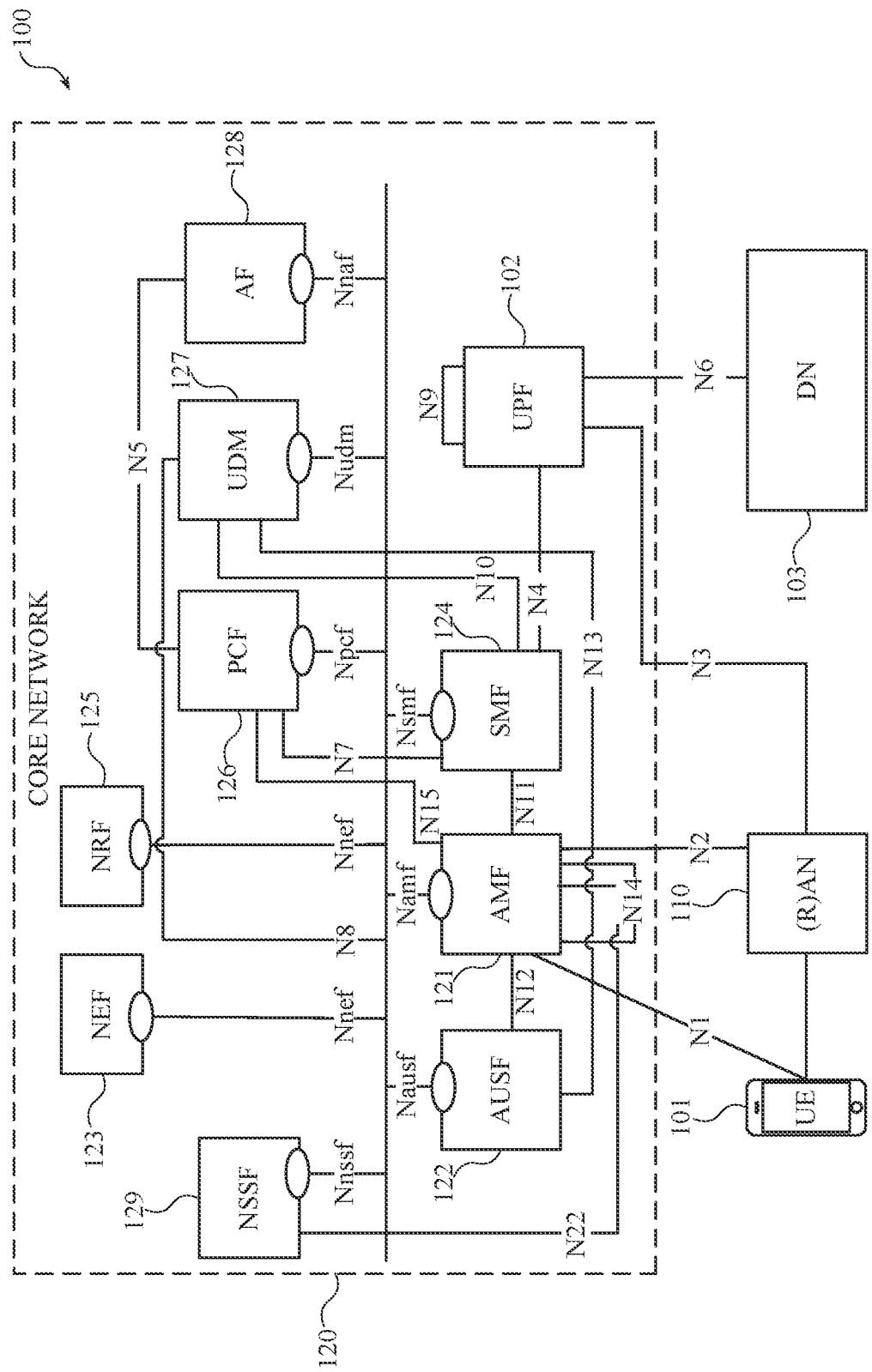
FIG. 1 illustrates an architecture of a system including a Core Network (CN), for example a Fifth Generation (5G) CN (5GC), in accordance with various aspects (or embodiments).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.), a user equipment device (UE device) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

Mobile communications in next generation wireless communication systems continue to include features that support efficient use of resources while simultaneously supporting higher communication bandwidths and reliability. NR networks implement beam management techniques that include beam failure detection and recovery procedures to increase connection fidelity in adverse reception environments. After establishing a connection to a downlink (DL) beam, a UE can detect a beam failure with the DL beam. During the beam failure event, the UE can engage in various different beam failure recovery (BFR) and candidate beam detection (CBD) procedures. BFR and CBD procedures can include various measurement and signaling events between a UE and the NR network, which take time and impacts resource utilization.

The measurements can include one or more of measurements defined by 3GPP TS 38.213 for example at section 6, synchronization signal block (SSB), or channel state information reference signal (CSI-RS) measurements based on a network radio resource channel (RRC) configured candidateBeamRSList or according to the SSB resource, if a candidate beam reference signal list is not received/there is not a RRC configured candidateBeamRSList, or if a beam failure recovery timer (beamFailureRecoveryTimer) has expired. Measurements can take place according to a CBD procedure. In one aspect, in conclusion of the CBD procedure, a BFR procedure can be initiated on a chosen resource based on measurement results associated with the CBD procedure until a random access channel (RACH) procedure is successfully completed. In another aspect, the CBD procedure can continue in parallel with the RACH procedure. The RACH procedure can include various amounts of UE and network signaling depending on if a contention based random access (CBRA) BFR process or a contention free random access (CFRA) BFR process is used.

In some situations, after a beam failure is detected, it is possible for the UE to maintain the link with the failed DL beam shortly after the beam failure is detected. In these situations, measurement and signaling events between the UE and the NR network can be skipped thereby restoring reception quicker and making efficient use of resources. The UE can detect a recovery abort condition after beginning a CBD procedure or a BFR procedure, and autonomously abort the CBD or BFR procedure before continuing measurements or a RACH procedure. After aborting the CBD or BFR procedure, the UE can maintain connection with the DL beam.

Various aspects of the present disclosure are directed towards an autonomous UE beam failure recovery abort procedure, and thus, can configure the UE beam failure recover abort procedure dynamically and autonomously without an external or base station trigger. After the UE detects the beam failure and initiates the BFR or CBD procedure, the UE can begin detection of the recovery abort condition. The recovery abort condition can include one or more conditions as described, for example, below/herein.

A first condition can be associated with a recovery indication threshold whereby the recovery abort condition can be satisfied when a number of no beam failure indications (BFIs) (or beam failure instances) satisfies a recovery indication threshold. A second condition can be associated with a quasi-co-located (QCLed) resource threshold that is QCLed with the failed beam. The recovery abort condition can be satisfied when the QCLed resource threshold is satisfied. A third condition can be associated with a CBD best candidate beam that is QCLed with the failed DL beam. The third condition can be satisfied when the CBD best candidate beam's reference signal received power (RSRP) satisfies a RSRP threshold, and the best candidate beam is QCLed with the failed DL beam.

The recovery abort condition (e.g., at least one of: the first, second, or third condition, as described herein) indicates that condition(s) to maintain connection with the failed beam are met, and that the failed beam is a valid connection beam. Furthermore, the UE can determine that a RACH procedure associated with a CBRA based BFR or a CFRA based BFR are not complete. The UE can autonomously abort the CBD or BFR procedures before at least one of a CBRA message 3 (Msg3) or a CFRA message 1 (Msg1) are transmitted, or after a RACH attempt fails. A RACH attempt failure can occur when a CFRA message 2 (Msg2) or a CBRA message 4 (Msg4) are not successful. Then the UE can maintain the connection with the failed DL beam. As such, the UE saves resources by skipping further measurements and signaling events, and maintaining reception with the network.

Aspects described herein can be implemented into a system using any suitably configured hardware and/or software. FIG. 1 illustrates an architecture of a system 100 including a Core Network (CN) 120, for example a Fifth Generation (5G) CN (5GC), in accordance with various aspects. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 110, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129, which can be connected by various interfaces and/or reference points, for example, as shown in FIG. 1.

Figure 2:
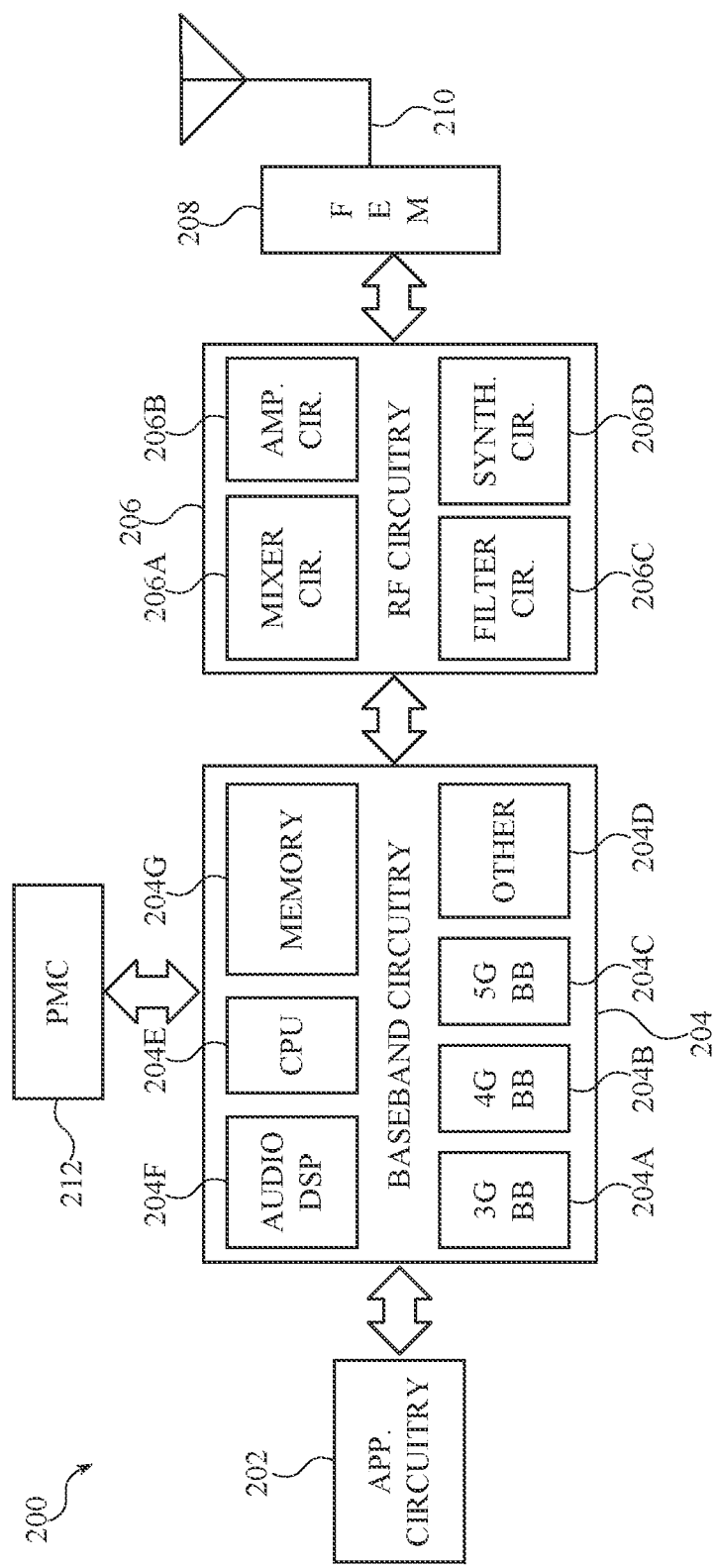
FIG. 2 is a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node can not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuity 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206*a*, amplifier circuitry 206*b* and filter circuitry 206*c*. In some aspects, the transmit signal path of the RF circuitry 206 can include filter circuitry 206*c* and mixer circuitry 206*a*. RF circuitry 206 can also include synthesizer circuitry 206*d* for synthesizing a frequency for use by the mixer circuitry 206*a* of the receive signal path and the transmit signal path. In some aspects, the mixer circuitry 206*a* of the receive signal path can be configured to down-convert RF signals received from the FEM circuitry 208 based on the synthesized frequency provided by synthesizer circuitry 206*d*. The amplifier circuitry 206*b* can be configured to amplify the down-converted signals and the filter circuitry 206*c* can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
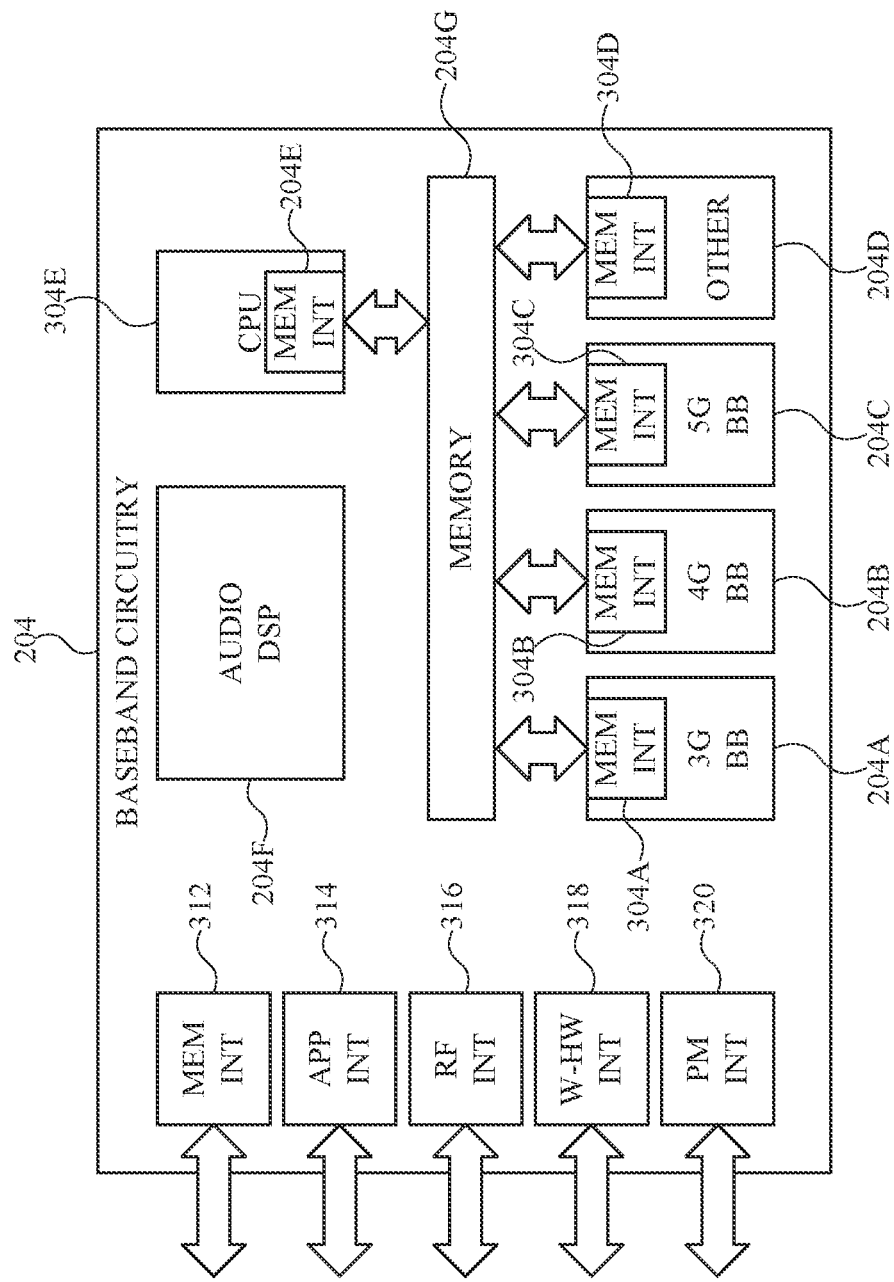
FIG. 3 is a diagram illustrating example interfaces of baseband circuitry that can be employed in accordance with various aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed in greater detail herein, various aspects, which can be employed, for example, at a UE, can facilitate power management in connection with wireless modem(s). Various aspects can employ power management techniques discussed herein, wherein, based on monitored levels of power consumption and temperature, one or more power management stages discussed herein can be employed to mitigate overheating. Power management stages discussed herein can reduce power consumption and associated overheating caused by 5G (Fifth Generation) NR (New Radio) operation, LTE (Long Term Evolution) operation, or both.

Figure 4:
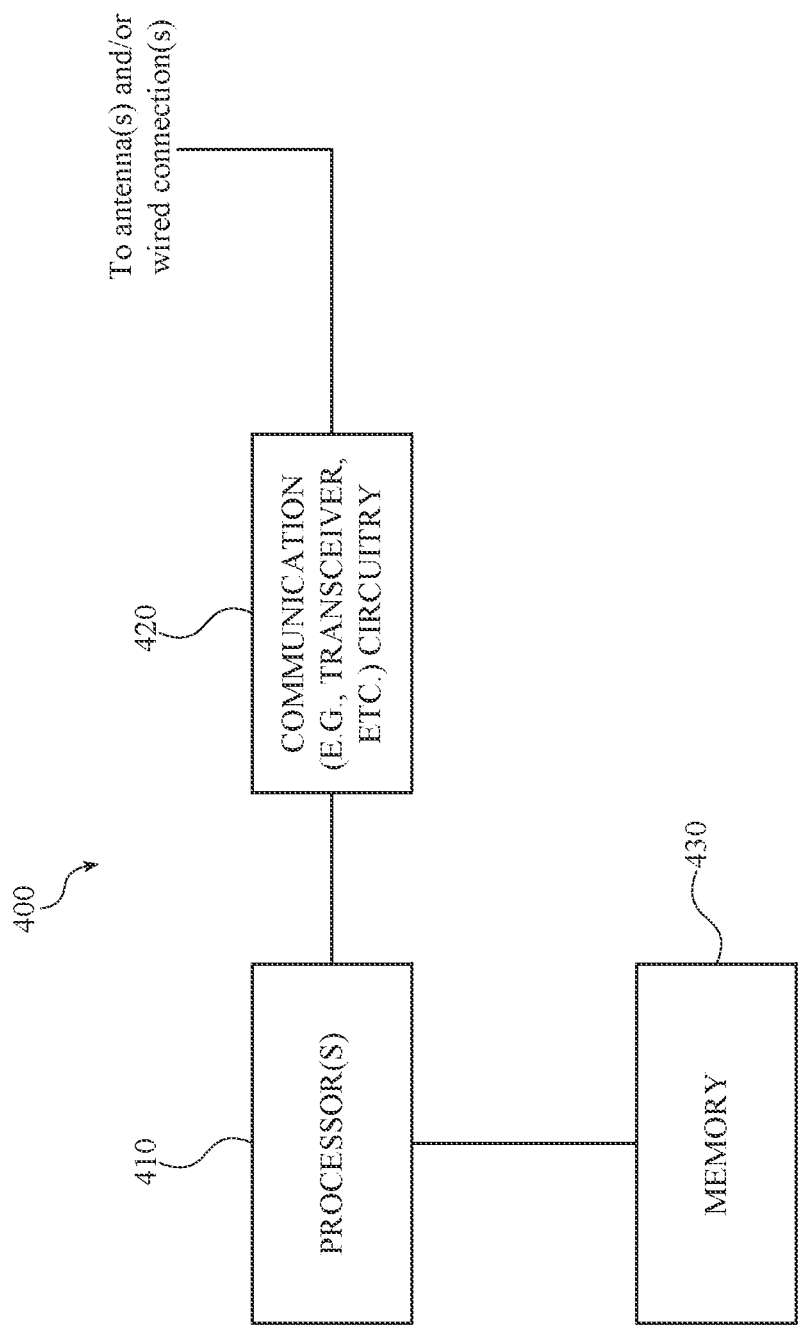
FIG. 4 is a block diagram illustrating a system that facilitates power management in connection with wireless modem(s), according to various aspects discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates power management in connection with wireless modem(s), according to various aspects discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Memory 430 (as well as other memory components discussed herein, e.g., memory 204G, data storage, or the like) can comprise one or more machine-readable medium/media including instructions that, when performed by a machine or component herein cause the machine to perform acts of the method or of an apparatus or system for concurrent communication using multiple communication technologies according to aspects and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Furthermore, the computer-readable medium may include non-transitory computer-readable medium. Non-transitory computer-readable medium includes all computer readable medium with the sole exception being a transitory, propagating signal.

Specific types of aspects of system 400 (e.g., UE aspects) can be indicated via subscripts (e.g., system $400_{UE}$ comprising processor(s) $410_{UE}$, communication circuitry $420_{UE}$, and memory $430_{UE}$). In some aspects, such as BS aspects (e.g., system $400_{gNB}$) and network component (e.g., UPF (User Plane Function), etc.) aspects (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In aspects, signaling or messaging between different aspects of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

The 3GPP (Third Generation Partnership Project) technical specifications (TSs) define optional power management related messages between a UE (User Equipment) and Base Station (BS, e.g., eNB (Evolved Node B) or gNB (next generation Node B), etc.).

In some aspects a UE 101 can establish a connection with a downlink (DL) beam of a network. The UE 101 can, for example, have one or more of components of the device 200, or aspects of system 400 including system $400_{UE}$, with processors $410_{UE}$, communication circuitry $420_{UE}$, memory $430_{UE}$ or the like. The UE 101 can, for example, establish a connection with the DL beam by communication circuitry $420_{UE}$ communicatively coupled to the memory $430_{UE}$ and configured to perform various operations. Further, the components can be an apparatus with specific functionality and the components can execute from various computer readable storage media or non-transitory computer readable media.

The DL beam can be a DL beam of a RAN node 110 which can include on or more of the BS, eNB, gNB, or other nodes discussed in FIG. 1. The RAN node 110 can, for example, have one or more components of the device 200, or aspects of system 400 including system $400_{gNB}$, processor $410_{gNB}$, communication circuitry $420_{gNB}$, memory $430_{gNB}$ or the like. Further, the components can be an apparatus with specific functionality and the components can execute from various computer readable storage media or non-transitory computer readable media.

The processor $410_{UE}$ of the UE 101 can detect a beam failure of the DL beam. The beam failure can occur in response to a quality metric monitored by the communication circuitry $420_{UE}$ falling below a certain quantity. For example, the beam failure can be based on at least one of a CSI-RS resource, a SSB resource of a NW RRC configured failure detection resource(s) (failureDetectionResources), or a CSI-RS resource comprised in an active transmission configuration indicator (TCI). In some aspects where multiple CSI-RS resources are in the active TCI state, the beam failure is associated with the CSI-RS that is QCLed with QCL Type-D in the active TCI State.

In response to the beam failure, the processor $410_{UE}$ can execute at least one of a BFR procedure or a CBD procedure. In some aspects, the CBD procedure is executed, and the BFR procedure is executed when the CBD procedure is completed. In other aspects the BFR procedure can be executed before the CBD procedure is completed, or the BFR and CBD procedures can be executed in parallel. The CBD procedure can determine candidate beam(s) of the BS in which beam failure was detected. The BFR procedure can recover connection with the BS by initiating a RACH procedure corresponding to a candidate beam of the determined candidate beams from the CBD procedure. If at least one of the BFR procedure or the CBD procedure is executed by the processor $410_{UE}$, the UE 101 can utilize significant signaling resources and time associated with completing the BFR procedure or the CBD procedure.

The processor $410_{UE}$ of the UE 101 can detect a recovery abort condition while executing the at least one of the BFR procedure or the CBD procedure. The recovery abort condition can indicate that the DL beam is a valid connection beam for the UE 101 to maintain connection with the network. The recovery abort condition includes one or more of a recovery indication threshold, a resource threshold QCLed with the failed beam, or a RSRP threshold QCLed with the failed beam. In some aspects, the processor $410_{UE}$ can determine a number of no BFIs, determine if the number of undetected BFIs satisfies the recovery abort threshold, and signal an indication, by the communication circuitry $420_{UE}$, that the recovery abort condition is satisfied in response to the recovery indication threshold being satisfied. The term "no BFIs" relates to a scenario where the processor $410_{UE}$ monitors for a BFI and does not detect a BFI event because beam measurements associated with the BFI procedure are satisfactory. In some aspects, the processor $410_{UE}$ can monitor one or more periodic QCLed resources that are QCLed with the DL beam, determine if the one or more periodic QCLed resources satisfies the QCLed resource threshold, and signal an indication, by the communication circuitry $420_{UE}$, that the recovery abort condition is satisfied in response to the QCLed resource threshold being satisfied by the one or more QCLed periodic resources (e.g., frequency, time, modulation symbols, spatial, coding, power resources, other channel properties, other antenna properties, etc.).

In some aspects, the processor $410_{UE}$ can determine a best candidate beam based on the CBD procedure where the best candidate beam is QCLed with the DL beam, measure a RSRP of the best candidate beam, determine if the RSRP of the best candidate beam satisfies the RSRP threshold, and signal an indication, by the communication circuitry $420_{UE}$, that the recovery abort condition is satisfied in response to the QCLed RSRP threshold being satisfied by the RSRP of the best candidate beam by the communication circuitry $420_{UE}$.

In some aspects the recovery indication threshold can be associated with at least one of a channel condition or a motion condition detected by the processor $410_{UE}$. In some aspects, the QCLed periodic resources include at least one of a CSI-RS resource or a SSB resource that are QCLed with the DL beam. Furthermore, the QCLed resource threshold can be associated with one or more of a channel condition and a motion condition detected by the processor $410_{UE}$.

In response to the processor $410_{UE}$ detecting that the recovery abort condition is satisfied with respect to one or more thresholds, the processor $410_{UE}$ can autonomously abort at least one of the BFR procedure or the CBD procedure. In some aspects, in response to a CBRA mode configuration of the UE 101, the BFR procedure or the CBD procedure can be aborted before the processor $410_{UE}$ generates a RACH Msg3 or after a RACH attempt fails. In other aspects, in response to a CFRA mode configuration of the UE 101, the BFR procedure or the CBD procedure can be aborted before the processor $410_{UE}$ generates a RACH Msg1 or after a RACH attempt fails.

In response to the processor $410_{UE}$ aborting the at least one of the BFR procedure or the CBD procedure, the UE 101 can maintain or re-establish connection with the DL beam of the RAN node 110. As such, the UE 101 conserves resources by skipping further measurements and signaling events associated with one or more of the BFR procedure, CBD procedure, or RACH procedures, and maintains reception with the network.

Figure 5:
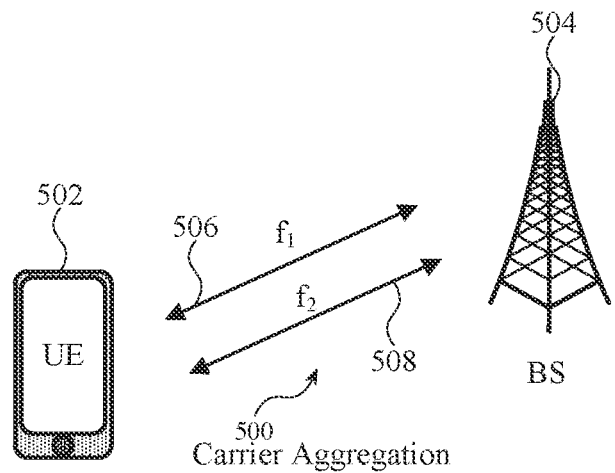
FIG. 5 illustrates a carrier aggregation (CA) mode of operation.
Figure 6:
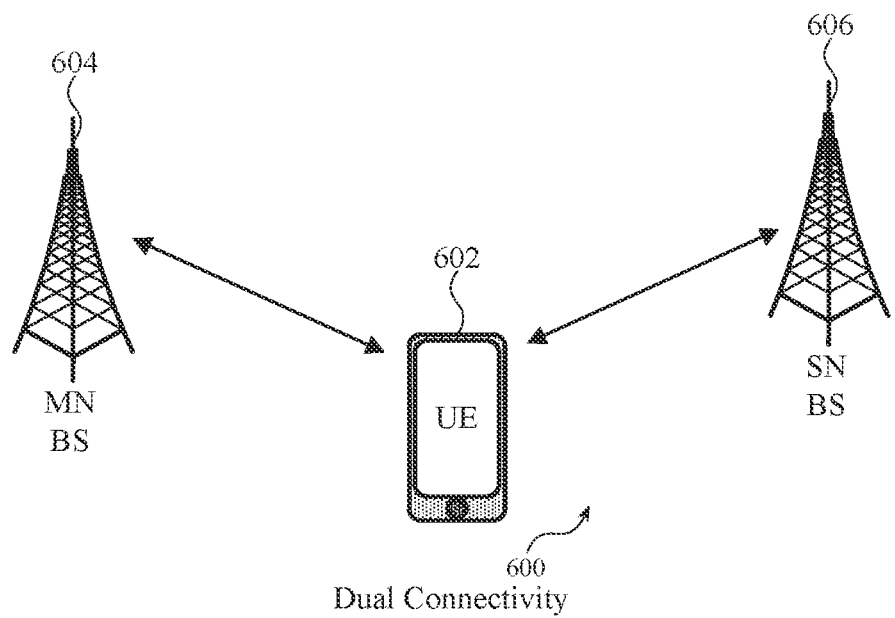
FIG. 6 illustrates a dual connectivity (DC) mode of operation.

FIG. 5 shows a UE 502 in a carrier aggregation (CA) mode 500 with a BS 504. In CA mode 500, the UE 502 and BS 504 combine two or more carriers (e.g. frequency 1 (f1) 506 and frequency 2 (f2) 508) into a single data channel thereby increasing the data rate. FIG. 6 show a UE 602 in a dual connectivity (DC) mode 600 with a master node (MN) BS 604 and a secondary node (SN) BS 606. The MN BS 604 comprises a group of cells for a master cell group (MCG), including a primary cell (PCell). The SN BS 606 comprises a group of cells for a secondary cell group (SCG), including a primary secondary cell group cell (PSCell). In DC mode 600, the UE engages in communications with the MN BS 604 and SN BS 606 simultaneously thereby increasing the data rate and providing load balancing among different BSs. CA mode (500 of FIG. 5) operations are also possible between the UE and at least one of the MCG or SCG to increase data rates.

Figure 7:
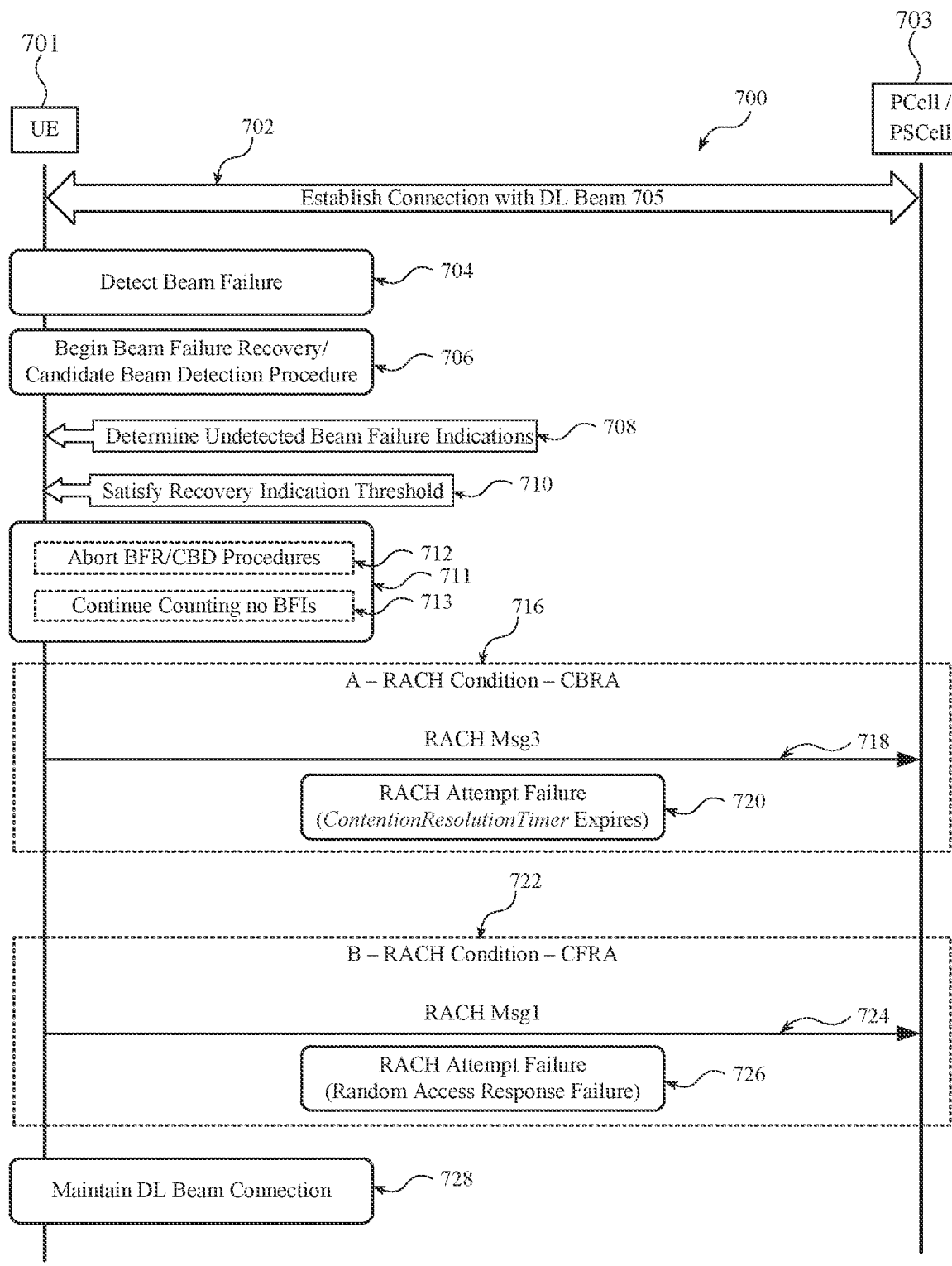
FIG. 7 illustrates a flow diagram of a method for a UE autonomous BFR procedure with a recovery abort condition associated with undetected beam failure indications.

FIG. 7 illustrates a flow diagram of a method 700 for a UE autonomous BFR procedure with a recovery abort condition associated with undetected beam failure indications.

At 702 a UE 701 can be configured in a DC mode 600 (e.g., by processor(s) $410_{UE}$) where the UE 701 is connected to a downlink (DL) beam 705 from a BS 703 (e.g., by communication circuitry $420_{UE}$). The UE 701 can, for example, be the UE 101, the RAN node, or the UE 502 or UE 602, with one or more of components of the device 200, or aspects of system 400 including system $400_{UE}$, with processors $410_{UE}$, communication circuitry $420_{UE}$, memory $430_{UE}$ or the like. A base station (BS) 703 can, for example, comprise at least one of a PCell from a MN BS 604, a PSCell from a SN BS 606, a gNodeB, or gNB, with one or more of components of the device 200, or aspects of system 400 including system $400_{gNB}$, processor $410_{gNB}$, communication circuitry $420_{gNB}$, memory $430_{gNB}$ or the like.

At 704, in response to establishing a connection with the DL beam 705, the UE 701 can detect a beam failure of the DL beam 705 (e.g., by processor(s) $410_{UE}$). For example, directional communications introduced by beam forming from the UE 701 and BS 703 can limit multipath diversity and make the communications link susceptible to changing channel conditions. The UE 701 can attempt to maintain connection with the DL beam 705 by utilizing beam tracking or beam refinement techniques to adapt to channel changes due to UE 701 movement, blockage, or environmental factors.

The beam failure can generally occur in response to a quality metric of the DL beam 705 satisfying a threshold that indicates connection with the DL beam 705 cannot be maintained. In some aspect, the beam failure is declared when a BFI counter threshold is satisfied as discussed further below. The UE 701 can perform beam related monitoring according to network conditions based on one or more of a layer 1 (L1), a layer 2 (L2) or a layer 3 (L3) communication/signaling. Furthermore, beam failure can occur when the beam tracking or beam refinement techniques are unsuccessful. The UE 701 can detect the beam failure by monitoring one or more metrics from the DL beam 705. The one or more metrics can correspond to a channel state information reference signal (CSI-RS) resource or a synchronization signal block (SSB) resource comprised in a network radio resource control (RRC) configured failure-DetectionResources.

In another example the UE 701 can detect the beam failure based on a CSI-RS resource comprised in an active transmission configuration indicator (TCI). The detection based on the active TCI state can occur if there are no RRC configured failureDetectionResources. The beam failure may be associated with a RS comprised in the active TCI where the RS is QCLed with QCL Type-D. The active TCI state can be received by the UE 701 in a downlink control information (DCI) from the BS 703, and can include one or more quasi-co-located (QCLed) relationships between a downlink reference signal and the CSI-RS resource. The one or more QCLed relationships can, for example, include channel properties that that can be sensed, conveyed, or inferred by devices of both the downlink reference signal and the CSI-RS resource. The channel properties can include one or more of frequency, time, modulation symbols, spatial, coding, power resources, other channel properties, other antenna properties.

At 706, in response to detecting the beam failure, the UE 701 can begin at least one of a beam failure recovery (BFR) procedure or a candidate beam detection (CBD) procedure (e.g., by processor(s) $410_{UE}$). The BFR procedure can be initiated when a beam failure indication counter (BFI_COUNTER) threshold is satisfied, such as a maximum, minimum or other threshold number of BFIs being determined or indicated. For example, BFIs are counted according to a measurement resource of the beam (i.e. signal to interference noise ratio (SINR), a BFI maximum count (BFI_maxCount) associated with the measurement resource indicates that the BFI_COUNTER threshold is satisfied while the BFI_COUNTER is active. The BFI_COUNTER can be reset if a BFD timer expires. The BFR procedure can include a BFI_COUNTER which is initially set to zero and maintained by the MAC layer. If the MAC layer receives a beam failure indication from the PHY layer, the BFI_COUNTER can be incremented by one. The beam failure is detected if the BFI_COUNTER satisfies the BFI_COUNTER threshold.

To configure the BFR procedure the BS 703, for example, configures the UE 701 to monitor reference signals for the BFR procedure from the BS 703. In some aspects, the BFR procedure can be configured using a Beam FailureRecoveryConfig information element (IE) of the BS 703. In some aspects, the BFR procedure can be based on a list, or a configuration of candidate beams or reference signals of the BS 703, which can include an index (e.g., a serving cell index (ServCellIndex)) introduced in a particular IE, such as a PRACH-resource dedicated BFR (PRACH-ResourceDedicatedBFR) configuration IE. In some aspects, the BFR procedure can be based on one or more recovery spaces of Beam Failure Request Response (BFRPs) and/or recoverySearchSpaceIds for the BS 703.

In executing the BFR procedure, the UE 701 can initiate a random access procedure with the BS 703. The UE 701 then can select a suitable beam to perform beam failure recovery. In some aspects the UE 701 can select a suitable beam to perform beam failure recovery based on the CBD procedure which can be based on a dedicated random access resource associated with the suitable beam (discussed further below). In response to selecting a suitable beam, the UE 701 the BS 703 can complete a contention based random access (CBRA) RACH procedure or a contention free random access (CFRA) RACH procedure.

The CBRA RACH procedure can sequentially include one or more of a Random Access Preamble as Msg1 from the UE 701 to the BS 703, a Random Access Response as Msg2 from the BS 703 to the UE 701, a scheduled Physical Uplink Shared Channel (PUSCH) transmission as Msg3 from the UE 701 to the BS 703, or a Contention Resolution as Msg4 from the BS 703 to the UE 701. Furthermore, the CBRA RACH procedure can include repeated transmission of any of the Msg1, Msg2, Msg3, or Msg4, or other signaling.

The CFRA RACH procedure can sequentially include one or more of a Random Access Preamble (Msg1) from the UE 701 to the BS 703, or a Random Access Response Msg2 from the BS 703 to the UE 701. Furthermore, the CFRA RACH procedure can include repeated transmission of any of the Msg1, Msg2, or other signaling.

In some aspects, the CBD procedure can be performed by the UE 701 based on a network configured candidate beam set as provided by the BS 703. As such, the network can signal indication of one or more beams of the BS 703, to the UE 701 via L1/L2/L3 signaling. The UE 701 can select the candidate beam from among the candidate beam set according to a beam quality associated with the BS 703. In some aspects, the UE 701 can select the beam that has the best radio quality for random access based on evaluation according to one or more criteria herein. For example, the UE 701 measures the RSRP of all or some of the candidate beams from among the candidate beam set, and determines the candidate beam with the highest RSRP has the best radio quality for random access. Alternatively, or additionally, the UE 701 can select the candidate beam as being suitable to satisfying a configured or predefined threshold for initial access.

In other aspects, the CBD procedure can be performed by the UE 701 absent the network configured beam set. If the network does not indicate the candidate beam set, or the candidate beam set does not have good enough quality satisfying the configured or predefined threshold, the UE 701 can select the candidate beam outside the configured set, for example, based on probabilities of beam quality or other related beam criteria.

After the beam failure is detected radio conditions can improve and it can be possible for the UE 701 to maintain the connection with the DL beam 705 shortly after the detected beam failure. For example, at any time during the at least one of the BFR procedure or the CBD procedure, radio conditions that resulted in the detected beam failure can change such that the UE 701 can maintain connection with the DL beam 705. If the connection with the DL beam 705 can be maintained, then the UE 701 can save resources and signaling by skipping at least one of the BFR procedure or the CBD procedure which can include a RACH procedure.

The recovery abort condition indicates that the DL beam 705 is a valid connection beam and that the UE 701 can maintain the connection with the DL beam 705. In response to beginning at least one of the BFR procedure or the CBD procedure, the UE 701 can monitor the recovery abort condition and detect if the recovery abort condition is satisfied while executing the at least one of the BFR procedure or the CBD procedure.

The recovery abort condition, for example, can include a recovery indication threshold that indicates no beam failure indications (BFIs) (or beam failure instances) associated with the DL beam 705. The recovery indication threshold can be generated by the UE 701 or determined by the UE 701 from signaling with the network.

At 708 the UE 701 can determine a number of no BFIs associated with the DL beam 705 (e.g., by processor(s) 410$_{UE}$ and memory 430$_{UE}$). In some aspects, during the BFR procedure, the physical (PHY) sublayer can send BFIs to a medium access control (MAC) entity if certain beam measurement criteria of the DL beam 705 are not satisfied.

In some aspects, the UE 701 can determine a number of consecutive frames of no BFIs. In other aspects, the UE 701 can determine a number of no BFIs intermixed with detected BFIs over a set of frames.

The recovery indication threshold can be based on at least one of a channel condition or a motion condition detected by the UE 701. The channel condition can include at least one of a channel quality indicator (CQI), RSRP, precoding matrix indicator (PMI), CSI-RS, SSB, bandwidth parts (BPW), or the like. The motion condition can include at least one of an accelerometer condition, orientation sensor condition, a mobility state of the UE 701, or the like.

At 710 the UE 701 can determine whether the number of no BFIs satisfies the recovery indication threshold and signal an indication that the recovery abort condition is satisfied in response to the recovery indication threshold being satisfied (e.g., by processor(s) 410$_{UE}$ and memory 430$_{UE}$). As such, the UE 701 autonomously determines that the connection with the DL beam 705 is a valid connection beam.

At 711, in response to determining that the recovery abort condition is satisfied, the UE 701 can determine a RACH condition, and autonomously abort the at least one of the BFR procedure or the CBD procedure at 712 in response to satisfying the RACH condition (e.g., by processor(s) 410$_{UE}$ and communication circuitry 420$_{UE}$). Additionally, or alternatively, the UE 701 can continue counting BFIs.

The UE 701 can abort at least one of the BFR procedure or the CBD procedure at any point during the BFR procedure or the CBD procedure. The BFR procedure can include a CBRA mode with the CBRA RACH procedure or a CFRA mode with the CFRA RACH procedure.

For example, as shown at 728, the UE 701 can determine that the RACH condition can be satisfied when the CBRA RACH procedure has not yet signaled a CBRA RACH Msg3 at 718, after a CBRA RACH attempt fails (e.g., by processor(s) 410$_{UE}$ and memory 430$_{UE}$) at 720. In some aspects, the CBRA RACH attempt fails when a contention resolution was not successful, for example, when a random access contention resolution timer (ra-ContentionResolutionTimer) associated with the CBRA RACH procedure expires. The RACH condition can be satisfied when the BS 703 has not yet identified the UE 701 attempted RACH signaling via a cell radio network temporary identifier (C-RNTI) of the UE 701 as part of the CBRA RACH procedure. Furthermore, the RACH condition can be satisfied when the CBRA RACH procedure has not yet scheduled a MAC control element (CE) Msg3 transmission.

In another example, as shown at 722 (e.g., by processor(s) 410$_{UE}$ and memory 430$_{UE}$), the UE 701 can determine that the RACH condition can be satisfied when the CFRA RACH procedure has not yet signaled a CFRA RACH Msg1 at 724, after a CFRA RACH attempt fails at 726. In some aspects, the CFRA RACH attempt fails when a random access response was not successful, for example, a random access response window (ra-Response Window) configured by a beam failure recovery configuration (BeamFailureRecoveryConfig) expires. In addition, the CFRA RACH attempt can fail when a PDCCH transmission in a search space indicated by a recovery search space ID (recoverySearchSpaceId) addressed to a C-RNTI of the BS 703 is not received by the BS 703. Furthermore, the RACH condition can be satisfied when the BS 703 has not yet identified the UE 701 attempted RACH signaling via a random access (RA) preamble from the UE 701 as part of the CBRA RACH procedure.

At 714, in response to autonomously aborting the at least one of the BFR procedure or the CBD procedure, the UE 701 can maintain the connection with the DL beam 705 (e.g., by processor(s) 410$_{UE}$ and communication circuitry 420$_{UE}$). As such, the UE 701 autonomously determines that the DL beam 705 is a valid beam in response to detecting the beam failure, and the UE 701 skips potential signaling and measurements that can occur during at least one of the BFR Method 800 includes 702 through 706 where the UE 701 can establish a connection with the DL beam 705 at 702, detect a beam failure with the DL beam 705 at 704, and begin at least one of a BFR procedure or a CBD procedure at 706 in response to detecting the beam failure. Further details regarding 702 through 706 are discussed in the description of FIGS. 7.

At 802 and 804, the UE 701 can detect a recovery abort condition while executing the at least one of BFR procedure or CBD procedure (e.g., by processor(s) 410$_{UE}$ and memory 430$_{UE}$). In response to beginning at least one of the BFR procedure or the CBD procedure, the UE 701 can monitor the recovery abort condition and detect if the recovery abort condition is satisfied while executing the at least one of the BFR procedure or the CBD procedure.

The recovery abort condition can include a threshold that, if satisfied by one or more periodic resources that are quasi-co-located (QCLed) with the DL beam 705, indicates that the BFR procedure can be aborted. The one or more periodic resources that are QCLed with the DL beam are resources that can be associated with another candidate beam that is QCLed with the DL beam 705. The QCLed resource threshold can be generated by the UE 701 or determined by the UE 701 from signaling with the network.

At 802 the UE 701 can monitor and detect the one or more QCLed periodic resources. The one or more QCLed periodic resources can include at least one of a CSI-RS resource or a SSB resource of a candidate beam that is QCLed with the DL beam 705. The QCLed resource threshold can be based on at least one of a channel condition or a motion condition detected by the UE 701. The channel condition can include at least one of a CQI, RSRP, PMI, CSI-RS, SSB, bandwidth parts (BPW), or the like. The motion condition can include at least one of an accelerometer condition, orientation sensor condition, a mobility state of the UE 701, or the like. Furthermore, the QCLed resource threshold can be generated by the UE 701 or determined by the UE 701 from signaling with the network At 804 the UE 701 can determine whether the one or more periodic QCLed resources satisfies the QCLed resource threshold and signal an indication that the recovery abort condition is satisfied in response to the QCLed resource threshold being satisfied by the one or more QCLed periodic resources. As such the UE 701 autonomously determines that the connection with the DL beam 705 is a valid connection beam.

In response to determining that the recovery abort condition is satisfied, the UE 701 can proceed with autonomously aborting the at least one of the BFR procedure or the CBD procedure when the RACH condition is satisfied at 712. In response to autonomously aborting the at least one of the BFR procedure or the CBD procedure, the UE 701 can maintain the connection with the DL beam 705 at 714. The UE 701 can autonomously abort the at least one of the BFR procedure or CBD procedure and maintain connection with the DL beam 705 even if there is a better candidate beam. Further details regarding 712 and 714 are discussed in the description of FIG. 7.

Figure 9:
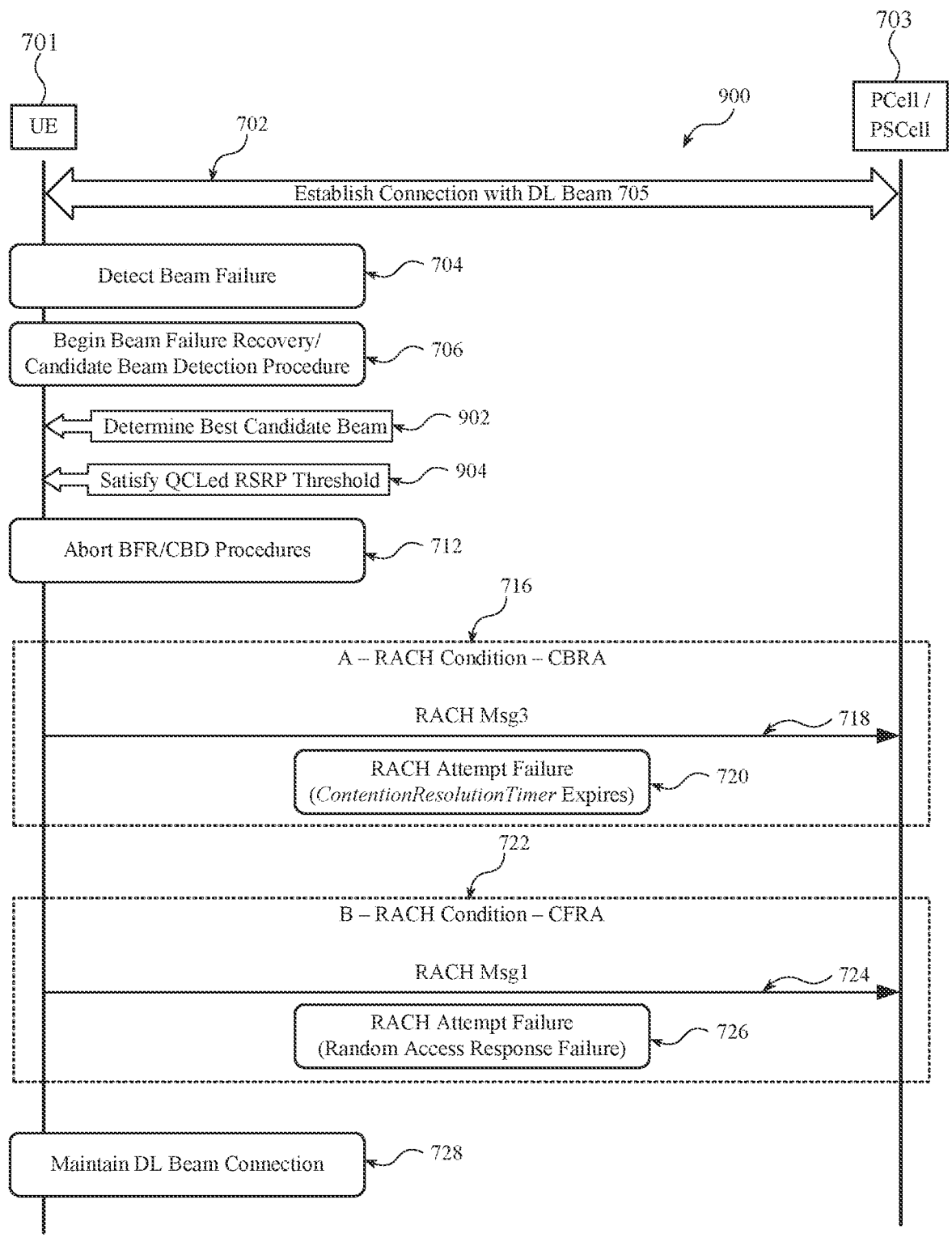
FIG. 9 illustrates a flow diagram of a method for a UE autonomous BFR procedure with a recovery abort condition associated with a RSRP of a quasi-co-located (QCLed) best candidate beam.

FIG. 9 illustrates a flow diagram of a method 900 for a UE 701 autonomous BFR procedure with a recovery abort condition associated with a RSRP of a quasi-co-located (QCLed) best candidate beam. Method 900 shows several similar embodiments to that discussed in FIG. 7, as well as alternative embodiments with regards to the recovery abort condition including determining a best candidate beam at 902 that satisfies a QCLed RSRP threshold at 904

Method 900 includes 702 through 706 where the UE 701 can establish a connection with the DL beam 705 at 702, detect a beam failure with the DL beam 705 at 704, and begin at least one of a BFR procedure or a CBD procedure at 706 after detecting the beam failure. Further details regarding 702 through 706 are discussed in the description of FIGS. 7.

At 902 and 904, the UE 701 can detect a recovery abort condition while executing the at least one of BFR procedure or CBD procedure (e.g., by processor(s) 410$_{UE}$ and memory 430$_{UE}$). In response to beginning at least one of the BFR procedure or the CBD procedure, the UE 701 can monitor the recovery abort condition and detect if the recovery abort condition is satisfied while executing the at least one of the BFR procedure or the CBD procedure.

The recovery abort condition can include a RSRP threshold that indicates a RSRP of a best candidate beam that is QCLed with the DL beam 705. The RSRP threshold can be generated by the UE 701 or determined by the UE 701 from signaling with the network.

At 902 as part of the CBD procedure, the UE 701 can determine the best candidate beam that is QCLed with the DL beam 705 (e.g., by processor(s) 410$_{UE}$ and communication circuitry 420$_{UE}$). The best candidate beam can be a candidate beam with a highest RSRP of all possible candidate beams.

At 904 the UE 701 can measure the RSRP of the best candidate beam (e.g., by processor(s) 410$_{UE}$ and communication circuitry 420$_{UE}$) and determine whether the RSRP of the best candidate beam satisfies the RSRP threshold and signal an indication that the recovery abort condition is satisfied in response to the RSRP threshold being satisfied by the RSRP of the best candidate beam. As such the UE 701 autonomously determines that the connection with the DL beam 705 is a valid connection beam.

In response to determining that the recovery abort condition is satisfied, the UE 701 can proceed with autonomously aborting the at least one of the BFR procedure or the CBD procedure when the RACH condition is satisfied at 712. In response to autonomously aborting the at least one of the BFR procedure or the CBD procedure, the UE 701 can maintain the connection with the DL beam 705 at 714. Further details regarding 712 and 714 are discussed in the description of FIG. 7.

Figure 10:
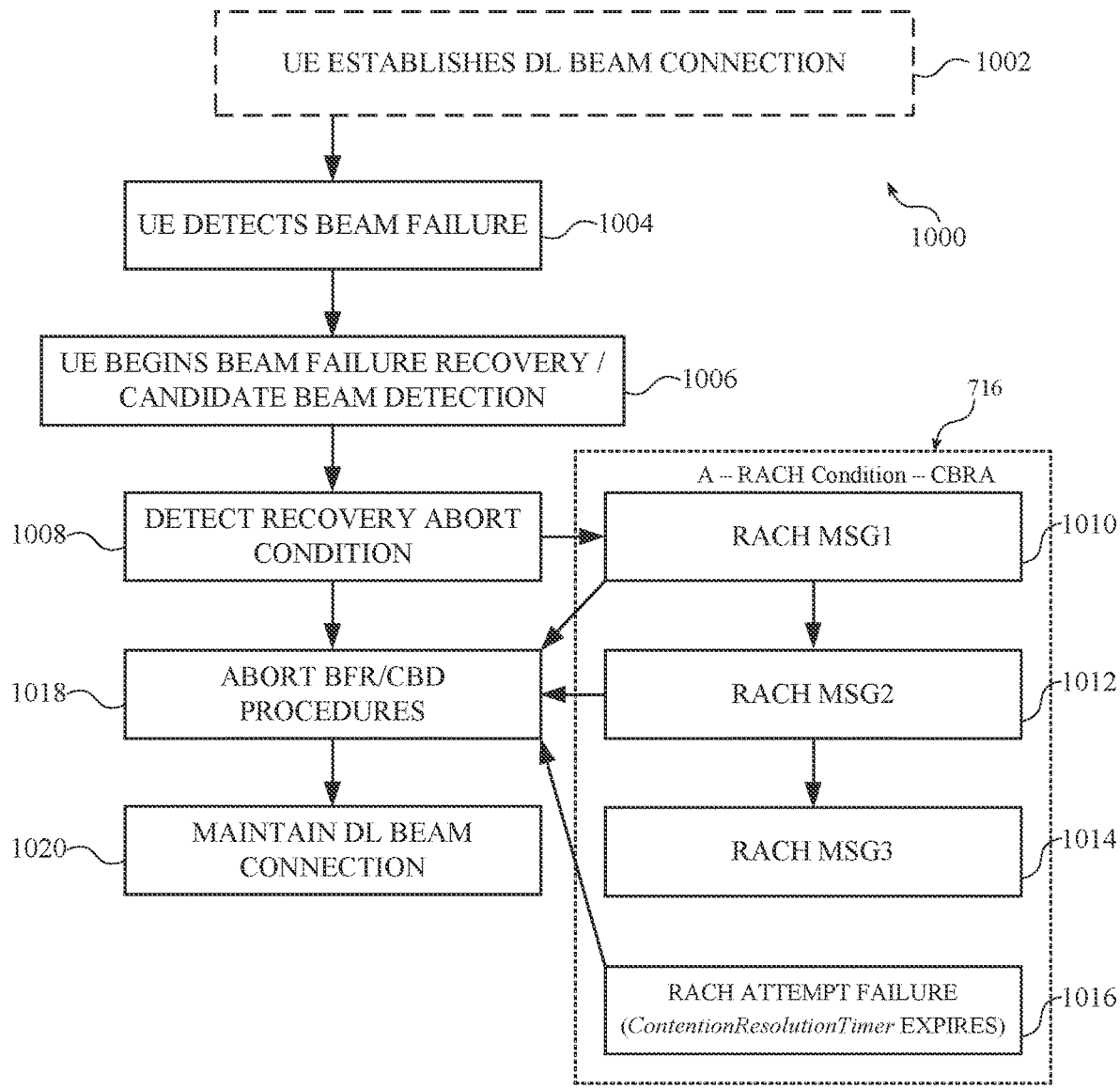
FIG. 10 illustrates a flow diagram of some aspects of a method 1000 for a UE autonomous BFR procedure with a recovery abort condition and a RACH condition that are satisfied prior to particular CBRA RACH signaling.

FIG. 10 illustrates a flow diagram of some aspects of a method 1000 for a UE 701 autonomous BFR procedure with a recovery abort condition and a RACH condition that are satisfied prior to particular CBRA RACH signaling.

At act 1002, the UE 701 establishes a DL beam 705 connection. FIG. 7 at 702 corresponds to some aspects of act 1002.

At act 1004, the UE 701 detects a beam failure with the DL beam 705. FIG. 7 at 704 corresponds to some aspects of act 1004.

At act 1006, in response to detecting the beam failure, the UE 701 begins at least one of a BFR procedure or a CBD procedure. FIG. 7 at 706 corresponds to some aspects of act 1006.

Figure 8:
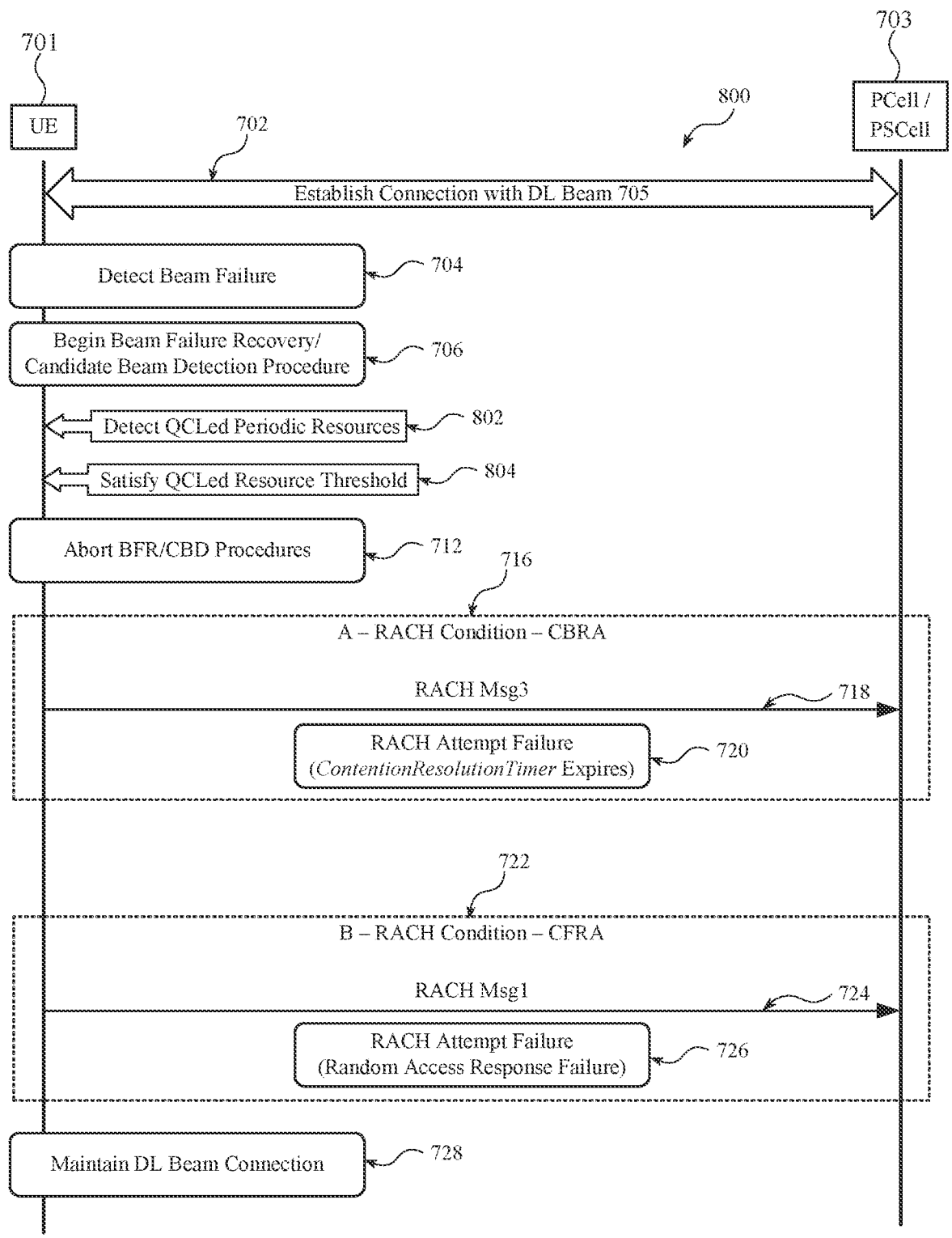
FIG. 8 illustrates a flow diagram of a method for a UE autonomous BFR procedure with a recovery abort condition associated with one or more periodic quasi-co-located (QCLed) resources.

At act 1008, the UE 701 detects a recovery abort condition while executing the at least one of the BFR procedure or the CBD procedure. At least one of FIG. 7 at 708 and 710; FIG. 8 at 802 and 804; or FIG. 9 at 902 and 904 correspond to some aspects of act 1008.

In response to determining that the recovery abort condition is satisfied, the UE 701 can determine a RACH condition, and autonomously abort the at least one of the BFR procedure or the CBD procedure when the RACH condition is satisfied. The UE 701 can abort at least one of the BFR procedure or the CBD procedure at any point during the BFR procedure or the CBD procedure. At least one of the BFR procedure or the CBD procedure can include a CBRA mode with a CBRA RACH procedure.

In one aspect, the RACH condition can be satisfied before CBRA RACH signaling occurs. For example, the RACH condition can be satisfied before a RACH Msg1 is generated at 1010. As such, upon determining that both the RACH condition and recovery abort condition are satisfied, the UE 701 can abort at least one of the BFR procedure or the CBD procedure at 1018.

In another aspect, the RACH condition can be satisfied after CBRA RACH signaling occurs. The CBRA RACH procedure can include the features at 728. The RACH condition can be satisfied in response to the UE 701 generating a RACH Msg1 at 1010. In another aspect, the RACH condition can be satisfied in response to a BS 703 transmitting a RACH Msg 2 at 1012. In another aspect the RACH condition can be satisfied prior to generating a RACH Msg3 at 1014. In another aspect the RACH condition can be satisfied prior to a non-final RACH attempt, prior to a RACH repetition, or prior to a final RACH attempt that has failed such as expiration of a ContentionResolutionTimer at 1016. FIG. 7 at 728 can correspond to some aspects of acts 1010 through 1016.

At act 1018, in response to determining that the recovery abort condition is satisfied and the RACH condition is satisfied, the UE 701 can autonomously abort at least one of the BFR procedure or the CBD procedure. FIG. 7 at 712 corresponds to some aspects of act 1018.

At act 1020 in response to autonomously aborting the at least one of the BFR procedure or the CBD procedure, the UE 701 can maintain the connection with the DL beam 705. FIG. 7 at 714 corresponds to some aspects of act 1020.

Figure 11:
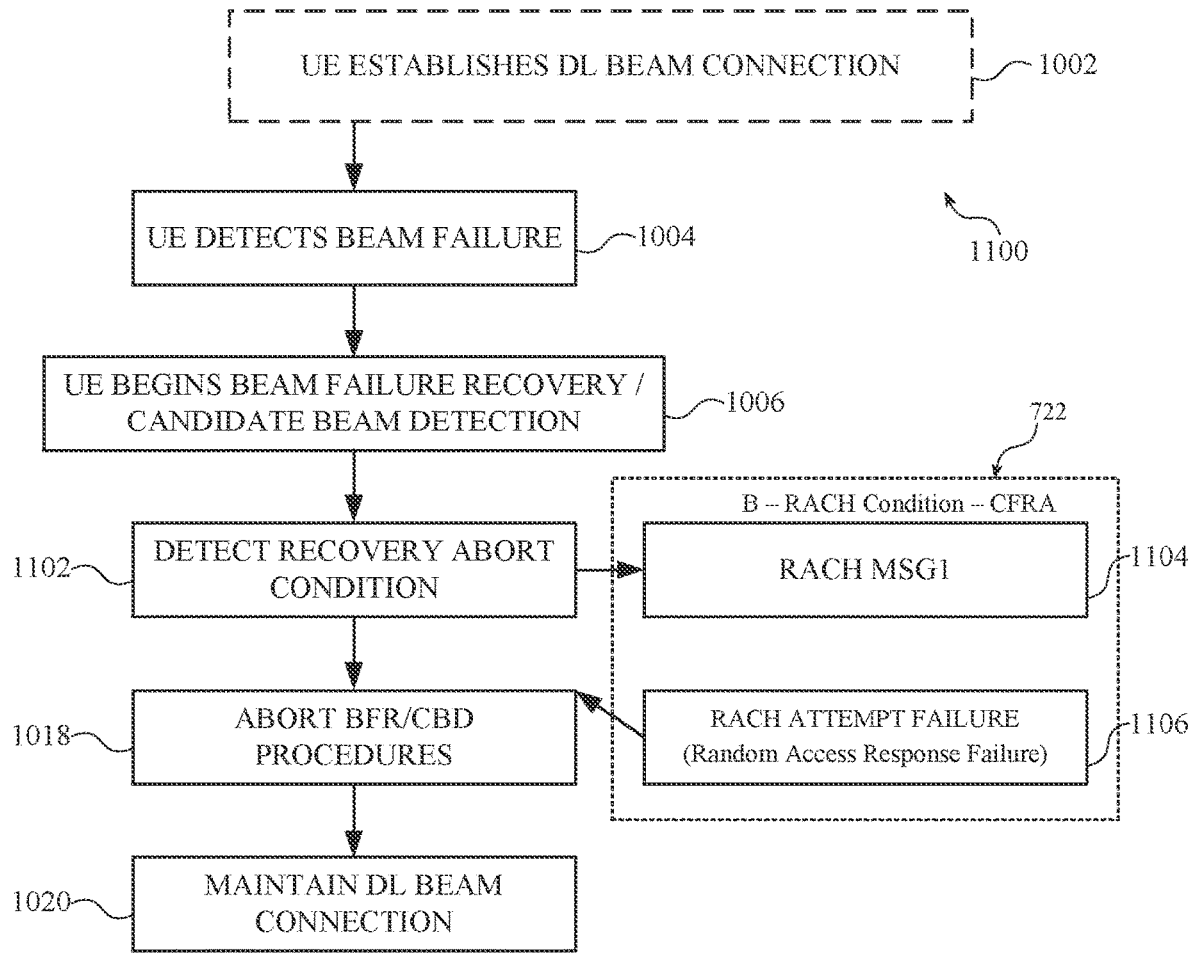
FIG. 11 illustrates a flow diagram of some aspects of a method 1100 for a UE autonomous BFR procedure with a recovery abort condition and a RACH condition that are satisfied prior to a particular CFRA RACH signaling.

FIG. 11 illustrates a flow diagram of some aspects of a method 1100 for a UE 701 autonomous BFR procedure with a recovery abort condition and a RACH condition that are satisfied prior to a particular CFRA RACH signaling.

Method 1100 shares the same description of acts 1002 through 1006 as described in FIG. 10 at acts 1002 through 1006.

At act 1102, the UE 701 detects a recovery abort condition while executing the at least one of the BFR procedure or the CBD procedure. At least one of FIG. 7 at 708 and 710; FIG. 8 at 802 and 804; or FIG. 9 at 902 and 904 correspond to some aspects of act 1102.

In response to determining that the recovery abort condition is satisfied, the UE 701 can determine a RACH condition, and autonomously abort the at least one of the BFR procedure or the CBD procedure when the RACH condition is satisfied. The UE 701 can abort at least one of the BFR procedure or the CBD procedure at any point during the BFR procedure or the CBD procedure. At least one of the BFR procedure or the CBD procedure can include a CFRA mode with a CFRA RACH procedure.

In one aspect, the RACH condition can be satisfied before any CFRA RACH signaling occurs. For example, the RACH condition can be satisfied before a RACH Msg1 is generated at 1104. As such, upon determining that both the RACH condition and recovery abort condition are satisfied, the UE 701 can abort at least one of the BFR procedure or the CBD procedure at 1018.

In another aspect, the RACH condition can be satisfied after CFRA RACH signaling occurs. The CFRA RACH procedure can include the features at 722. The RACH condition can be satisfied prior to a non-final RACH attempt, prior to a RACH repetition, or prior to a final RACH attempt fails at 1106 such as a random access response failure. FIG. 7 at 722 can correspond to some aspects of acts 1104 through 1106.

Method 1100 shares the same description of acts 1018 through 1020 as described in FIG. 10 at acts 1018 through 1020.

Figure 12:
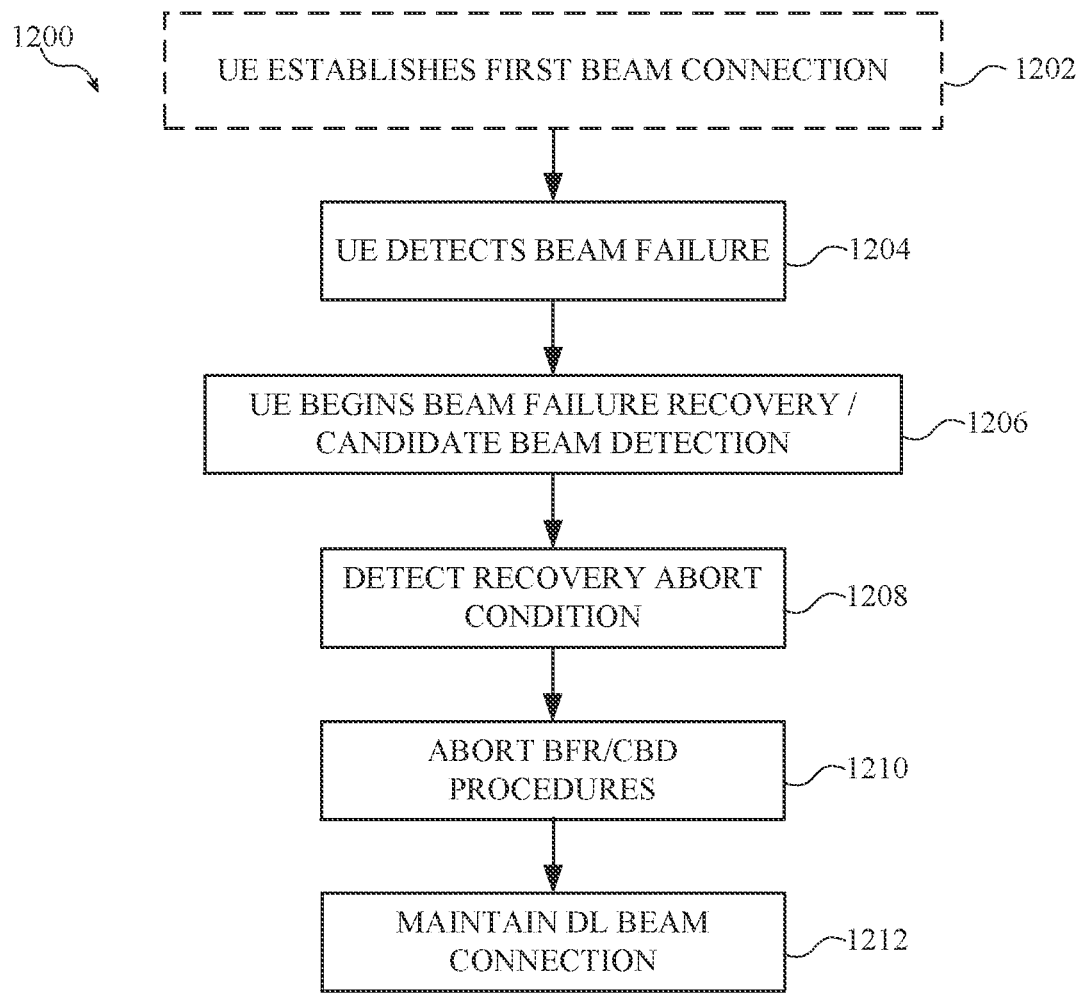
FIG. 12 illustrates a flow diagram of some aspects of a method 1200 for a UE autonomous BFR procedure with a recovery abort condition.

FIG. 12 illustrates a flow diagram of some aspects of a method 1200 for a UE 701 autonomous BFR procedure with a recovery abort condition.

At act 1202, the UE 701 establishes a DL beam 705 connection. FIG. 7 at 702 corresponds to some aspects of act 1202.

At act 1204, the UE 701 detects a beam failure with the DL beam 705. FIG. 7 at 704 corresponds to some aspects of act 1204.

At act 1206, after detecting the beam failure, the UE 701 begins at least one of a BFR procedure or a CBD procedure. FIG. 7 at 706 corresponds to some aspects of act 1206.

At act 1208, the UE 701 detects a recovery abort condition while executing the at least one of the BFR procedure or the CBD procedure. At least one of FIG. 7 at 708 and 710; FIG. 8 at 802 and 804; or FIG. 9 at 902 and 904 correspond to some aspects of act 1208.

At act 1210, in response to determining that the recovery abort condition is satisfied, the UE 701 can autonomously abort the at least one of the BFR procedure or the CBD procedure. FIG. 7 at 712 corresponds to some aspects of act 1210

At act 1212, in response to autonomously aborting the at least one of the BFR procedure or the CBD procedure, the UE 701 can maintain the connection with the DL beam 705. FIG. 7 at 714 corresponds to some aspects of act 1212.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a baseband processor configured to perform operations comprising: establishing a connection with a downlink (DL) beam; detecting a beam failure of the DL beam; in response to the beam failure, executing at least one of: a beam failure recovery (BFR) procedure or a candidate beam detection (CBD) procedure; detecting a recovery abort condition while executing the at least one of: the BFR procedure or the CBD procedure; aborting the at least one of: the BFR procedure or the CBD procedure, in response to detecting that the recovery abort condition is satisfied; and maintaining the connection with the DL beam.

Example 2 comprises the subject matter of example 1, wherein the recovery abort condition indicates that the DL beam is a valid connection beam.

Example 3 comprises the subject matter of example 1, further configured to: detect the beam failure of the DL beam based on at least one of: a channel state information reference signal (CSI-RS) resource or a synchronization signal block (SSB) resource comprised in a network (NW) radio resource control (RRC) configured failureDetectionResources; or a CSI-RS resource comprised in an active transmission configuration indicator (TCI).

Example 4 comprises the subject matter of example 1, further configured to: in response to a contention based random access (CBRA) mode, abort the at least one of: the BFR procedure or the CBD procedure before generating a random access channel (RACH) Msg3 or after a RACH attempt fails.

Example 5 comprises the subject matter of example 1, further configured to: in response to a contention free random access (CFRA) mode, abort the at least one of: the BFR procedure or the CBD procedure before generating a random access channel (RACH) Msg1 or after a RACH attempt fails.

Example 6 comprises the subject matter of example 1, wherein the recovery abort condition includes a recovery indication threshold and further configured to: determine a number of no beam failure indications (BFIs); determine whether the number of no BFIs satisfies the recovery indication threshold; and signal an indication that the recovery abort condition is satisfied in response to the recovery indication threshold being satisfied.

Example 7 comprises the subject matter of example 6, wherein the recovery indication threshold is based on at least one of: a channel condition or a motion condition detected by the baseband processor.

Example 8 comprises the subject matter of example 1, wherein the recovery abort condition includes a quasi-co-located (QCLed) resource threshold and further configured to: monitor one or more periodic resources that are QCLed with the DL beam; determine whether the one or more periodic resources satisfies the QCLed resource threshold; and signal an indication that the recovery abort condition is satisfied in response to the QCLed resource threshold being satisfied by the one or more periodic resources.

Example 9 comprises the subject matter of example 8, wherein the one or more periodic resources include at least one of: a channel state information reference signal (CSI-RS) resource or a synchronization signal block (SSB) resource that are QCLed with the DL beam and wherein the QCLed resource threshold is based on one or more of a channel condition and a motion condition detected by the baseband processor.

Example 10 comprises the subject matter of example 1, wherein the recovery abort condition includes a quasi-co-located (QCLed) reference signal received power (RSRP) threshold and further configured to: determine a best candidate beam based on the CBD procedure, wherein the best candidate beam is QCLed with the DL beam; measure a RSRP of the best candidate beam; determine whether the RSRP of the best candidate beam satisfies the QCLed RSRP threshold; and signal an indication that the recovery abort condition is satisfied in response to the QCLed RSRP threshold being satisfied by the RSRP of the best candidate beam.

Example 11 is a non-transitory computer-readable medium comprising instructions that, when executed, cause a User Equipment (UE) to: establish a connection with a downlink (DL) beam; detect a beam failure of the DL beam; in response to the beam failure, execute at least one of: a beam failure recovery (BFR) procedure or a candidate beam detection (CBD) procedure; detect a recovery abort condition while executing the at least one of: the BFR procedure or the CBD procedure; abort the at least one of: the BFR procedure or the CBD procedure, in response to detecting that the recovery abort condition is satisfied; and maintain the connection with the DL beam.

Example 12 comprises the subject matter of example 11, wherein the recovery abort condition indicates that the DL beam is a valid connection beam.

Example 13 comprises the subject matter of example 11, wherein the instructions, when executed, further cause the UE to: detect the beam failure of the DL beam based on at least one of: a channel state information reference signal (CSI-RS) resource or a synchronization signal block (SSB) resource comprised in a network (NW) radio resource control (RRC) configured failureDetectionResources; or a CSI-RS resource comprised in an active transmission configuration indicator (TCI).

Example 14 comprises the subject matter of example 11, wherein the instructions, when executed, further cause the UE to: in response to a contention based random access (CBRA) mode, abort the at least one of: the BFR procedure or the CBD procedure before generating a random access channel (RACH) Msg3 or after a RACH attempt fails.

Example 15 comprises the subject matter of example 11, wherein the instructions, when executed, further cause the UE to: in response to a contention free random access (CFRA) mode, abort the at least one of: the BFR procedure or the CBD procedure before generating a random access channel (RACH) Msg1 or after a RACH attempt fails.

Example 16 comprises the subject matter of example 11, wherein the recovery abort condition includes a recovery indication threshold and wherein the instructions, when executed, further cause the UE to: determine a number of no beam failure indications (BFIs); determine whether the number of no BFIs satisfies the recovery indication threshold; and signal an indication that the recovery abort condition is satisfied in response to the recovery indication threshold being satisfied.

Example 17 comprises the subject matter of example 16, wherein the recovery indication threshold is based on at least one of: a channel condition or a motion condition detected by the UE.

Example 18 comprises the subject matter of example 11, wherein the recovery abort condition includes a quasi-colocated (QCLed) resource threshold and wherein the instructions, when executed, further cause the UE to: monitor one or more periodic resources that are QCLed with the DL beam; determine whether the one or more periodic resources satisfies the QCLed resource threshold; and signal an indication that the recovery abort condition is satisfied in response to the QCLed resource threshold being satisfied by the one or more periodic resources.

Example 19 comprises the subject matter of example 18, wherein the one or more periodic resources include at least one of: a channel state information reference signal (CSI-RS) resource or a synchronization signal block (SSB) resource that are QCLed with the DL beam and wherein the QCLed resource threshold is based on one or more of a channel condition and a motion condition detected by the UE.

Example 20 comprises the subject matter of example 11, wherein the recovery abort condition includes a quasi-co-located (QCLed) reference signal received power (RSRP) threshold and wherein the instructions, when executed, further cause the UE to: determine a best candidate beam based on the CBD procedure, wherein the best candidate beam is QCLed with the DL beam; measure a RSRP of the best candidate beam; determine whether the RSRP of the best candidate beam satisfies the QCLed RSRP threshold; and signal an indication that the recovery abort condition is satisfied in response to the QCLed RSRP threshold being satisfied by the RSRP of the best candidate beam.

Example 21 is a User Equipment (UE) device, comprising: communication circuitry; and a processor configured to perform operations comprising: detecting a beam failure with a downlink (DL) beam; in response to the beam failure, executing at least one of: a beam failure recovery (BFR) procedure or a candidate beam detection (CBD) procedure; detecting a recovery abort condition while executing the at least one of: the BFR procedure or the CBD procedure; aborting the at least one of: the BFR procedure or the CBD procedure, in response to detecting that the recovery abort condition is satisfied; and maintaining a connection with the DL beam.

Example 22 comprises the subject matter of example 21, wherein the recovery abort condition includes at least one of a recovery indication threshold, a quasi-co-located (QCLed) resource threshold, or a reference signal received power (RSRP) threshold QCLed with the DL beam and wherein the operations further comprise: determining whether at least one of the recovery indication threshold, the QCLed resource threshold, or the RSRP threshold QCLed with the DL beam is satisfied; and signaling an indication that the recovery abort condition is satisfied in response to at least one of the recovery indication threshold, the QCLed resource threshold, or the RSRP threshold QCLed with the DL beam being satisfied.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature can have been disclosed with respect to only one of several implementations, such feature can be combined with one or more other features of the other implementations as can be desired and advantageous for any given or particular application.

What is claimed is:

1. A baseband processor configured to perform operations comprising:
    establishing a connection with a downlink (DL) beam;
    detecting a beam failure of the DL beam;
    in response to the beam failure, executing at least one of:
        a beam failure recovery (BFR) procedure or a candidate beam detection (CBD) procedure;
    detecting a recovery abort condition while executing the at least one of: the BFR procedure or the CBD procedure;
    aborting the at least one of: the BFR procedure or the CBD procedure, in response to detecting that the recovery abort condition is satisfied; and
    maintaining the connection with the DL beam.

2. The baseband processor of claim 1, wherein the recovery abort condition indicates that the DL beam is a valid connection beam.

3. The baseband processor of claim 1, further configured to:
    detect the beam failure of the DL beam based on at least one of:
        a channel state information reference signal (CSI-RS) resource or a synchronization signal block (SSB) resource comprised in a network (NW) radio resource control (RRC) configured failureDetectionResources; or
        a CSI-RS resource comprised in an active transmission configuration indicator (TCI).

4. The baseband processor of claim 1, further configured to:
    in response to a contention based random access (CBRA) mode, abort the at least one of: the BFR procedure or the CBD procedure before generating a random access channel (RACH) Msg3 or after a RACH attempt fails.

5. The baseband processor of claim 1, further configured to:
    in response to a contention free random access (CFRA) mode, abort the at least one of: the BFR procedure or the CBD procedure before generating a random access channel (RACH) Msg1 or after a RACH attempt fails.

6. The baseband processor of claim 1, wherein the recovery abort condition includes a recovery indication threshold and further configured to:
    determine a number of no beam failure indications (BFIs);
    determine whether the number of no BFIs satisfies the recovery indication threshold; and signal an indication that the recovery abort condition is satisfied in response to the recovery indication threshold being satisfied.

7. The baseband processor of claim 6, wherein the recovery indication threshold is based on at least one of: a channel condition or a motion condition detected by the baseband processor.

8. The baseband processor of claim 1, wherein the recovery abort condition includes a quasi-co-located (QCLed) resource threshold and further configured to:
  monitor one or more periodic resources that are QCLed with the DL beam;
  determine whether the one or more periodic resources satisfies the QCLed resource threshold; and
  signal an indication that the recovery abort condition is satisfied in response to the QCLed resource threshold being satisfied by the one or more periodic resources.

9. The baseband processor of claim 8, wherein the one or more periodic resources include at least one of: a channel state information reference signal (CSI-RS) resource or a synchronization signal block (SSB) resource that are QCLed with the DL beam and wherein the QCLed resource threshold is based on one or more of a channel condition and a motion condition detected by the baseband processor.

10. The baseband processor of claim 1, wherein the recovery abort condition includes a quasi-co-located (QCLed) reference signal received power (RSRP) threshold and further configured to:
  determine a best candidate beam based on the CBD procedure, wherein the best candidate beam is QCLed with the DL beam;
  measure a RSRP of the best candidate beam;
  determine whether the RSRP of the best candidate beam satisfies the QCLed RSRP threshold; and
  signal an indication that the recovery abort condition is satisfied in response to the QCLed RSRP threshold being satisfied by the RSRP of the best candidate beam.

11. A non-transitory computer-readable medium comprising instructions that, when executed, cause a User Equipment (UE) to:
  establish a connection with a downlink (DL) beam;
  detect a beam failure of the DL beam;
  in response to the beam failure, execute at least one of: a beam failure recovery (BFR) procedure or a candidate beam detection (CBD) procedure;
  detect a recovery abort condition while executing the at least one of: the BFR procedure or the CBD procedure;
  abort the at least one of: the BFR procedure or the CBD procedure, in response to detecting that the recovery abort condition is satisfied; and
  maintain the connection with the DL beam.

12. The non-transitory computer-readable medium of claim 11, wherein the recovery abort condition indicates that the DL beam is a valid connection beam.

13. The non-transitory computer-readable medium of claim 11, wherein the instructions, when executed, further cause the UE to:
  detect the beam failure of the DL beam based on at least one of:
    a channel state information reference signal (CSI-RS) resource or a synchronization signal block (SSB) resource comprised in a network (NW) radio resource control (RRC) configured failureDetectionResources; or
    a CSI-RS resource comprised in an active transmission configuration indicator (TCI).

14. The non-transitory computer-readable medium of claim 11, wherein the instructions, when executed, further cause the UE to:
  in response to a contention based random access (CBRA) mode, abort the at least one of: the BFR procedure or the CBD procedure before generating a random access channel (RACH) Msg3 or after a RACH attempt fails.

15. The non-transitory computer-readable medium of claim 11, wherein the instructions, when executed, further cause the UE to:
  in response to a contention free random access (CFRA) mode, abort the at least one of: the BFR procedure or the CBD procedure before generating a random access channel (RACH) Msg1 or after a RACH attempt fails.

16. The non-transitory computer-readable medium of claim 11, wherein the recovery abort condition includes a recovery indication threshold and wherein the instructions, when executed, further cause the UE to:
  determine a number of no beam failure indications (BFIs);
  determine whether the number of no BFIs satisfies the recovery indication threshold; and
  signal an indication that the recovery abort condition is satisfied in response to the recovery indication threshold being satisfied.

17. The non-transitory computer-readable medium of claim 16, wherein the recovery indication threshold is based on at least one of: a channel condition or a motion condition detected by the UE.

18. The non-transitory computer-readable medium of claim 11, wherein the recovery abort condition includes a quasi-co-located (QCLed) resource threshold and wherein the instructions, when executed, further cause the UE to:
  monitor one or more periodic resources that are QCLed with the DL beam;
  determine whether the one or more periodic resources satisfies the QCLed resource threshold; and
  signal an indication that the recovery abort condition is satisfied in response to the QCLed resource threshold being satisfied by the one or more periodic resources.

19. The non-transitory computer-readable medium of claim 18, wherein the one or more periodic resources include at least one of: a channel state information reference signal (CSI-RS) resource or a synchronization signal block (SSB) resource that are QCLed with the DL beam and wherein the QCLed resource threshold is based on one or more of a channel condition and a motion condition detected by the UE.

20. The non-transitory computer-readable medium of claim 11, wherein the recovery abort condition includes a quasi-co-located (QCLed) reference signal received power (RSRP) threshold and wherein the instructions, when executed, further cause the UE to:
  determine a best candidate beam based on the CBD procedure, wherein the best candidate beam is QCLed with the DL beam;
  measure a RSRP of the best candidate beam;
  determine whether the RSRP of the best candidate beam satisfies the QCLed RSRP threshold; and
  signal an indication that the recovery abort condition is satisfied in response to the QCLed RSRP threshold being satisfied by the RSRP of the best candidate beam.

21. A User Equipment (UE) device, comprising:
  communication circuitry; and
  a processor configured to perform operations comprising:
    detecting a beam failure with a downlink (DL) beam;

in response to the beam failure, executing at least one of: a beam failure recovery (BFR) procedure or a candidate beam detection (CBD) procedure;

detecting a recovery abort condition while executing the at least one of: the BFR procedure or the CBD procedure;

aborting the at least one of: the BFR procedure or the CBD procedure, in response to detecting that the recovery abort condition is satisfied; and maintaining a connection with the DL beam.

22. The UE device of claim 21, wherein the recovery abort condition includes at least one of a recovery indication threshold, a quasi-co-located (QCLed) resource threshold, or a reference signal received power (RSRP) threshold QCLed with the DL beam and wherein the operations further comprise:

determining whether at least one of the recovery indication threshold, the QCLed resource threshold, or the RSRP threshold QCLed with the DL beam is satisfied; and signaling an indication that the recovery abort condition is satisfied in response to at least one of the recovery indication threshold, the QCLed resource threshold, or the RSRP threshold QCLed with the DL beam being satisfied.

* * * * *